US010349500B2

(12) United States Patent
Amrine et al.

(10) Patent No.: US 10,349,500 B2
(45) Date of Patent: *Jul. 9, 2019

(54) CONNECTED LIGHTING SYSTEM

(71) Applicant: iLumisys, Inc., Troy, MI (US)

(72) Inventors: James M. Amrine, Ann Arbor, MI (US); Daniel J. Hollenkamp, Lake Orion, MI (US); John Ivey, Farmington Hills, MI (US); Francis Palazzolo, Shelby Township, MI (US); Scott Rundell, Troy, MI (US); James R. Scapa, West Bloomfield, MI (US)

(73) Assignee: iLumisys, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/041,325

(22) Filed: Jul. 20, 2018

(65) Prior Publication Data

US 2018/0332693 A1 Nov. 15, 2018

Related U.S. Application Data

(63) Continuation of application No. 15/393,558, filed on Dec. 29, 2016, now Pat. No. 10,057,966.

(Continued)

(51) Int. Cl.
*H05B 37/02* (2006.01)
*H05B 33/08* (2006.01)
(Continued)

(52) U.S. Cl.
CPC ..... *H05B 37/0272* (2013.01); *H05B 33/0845* (2013.01); *H05B 33/0857* (2013.01);
(Continued)

(58) Field of Classification Search
CPC ............ H05B 37/0272; H05B 33/0857; H05B 33/0845; H05B 37/0218; H05B 37/0227; G06F 3/04847; G06F 3/0482
(Continued)

(56) References Cited

U.S. PATENT DOCUMENTS 7,049,761 B2  5/2006 Timmermans et al.
7,510,299 B2  3/2009 Timmermans et al.
(Continued)

FOREIGN PATENT DOCUMENTS

WO  WO 2009/112996  9/2009
WO  WO 2015/036886  3/2015
WO  WO 2015/049412  4/2015

OTHER PUBLICATIONS

PCT Notification Concerning Transmittal of International Preliminary Report on Patentability in International Application No. PCT/US2017/024705, dated Oct. 18, 2018, 12 pages.
(Continued)

*Primary Examiner* — Don P Le
(74) *Attorney, Agent, or Firm* — Fish & Richardson P.C.

(57) ABSTRACT

Techniques are described for a lighting system in which light sources are controllable using signals sent over a wireless mesh network. During a commissioning process, a user interface (UI) may present a representation of nodes (e.g., light sources, sensors, controllers, etc.) that are broadcasting a wireless advertising signal. In response to a selection of a particular node, a wireless message may be sent to instruct the selected node to provide a visual indication of its presence, such as a flashing light. The visual indication may enable a user to discern the physical location of the node, such that each node may be added to the mesh network and, in some instances, to a group of nodes. The UI may also enable the definition of scenes, where each scene describes (Continued)

the brightness level or other operating characteristics of particular light source(s) and/or group(s) of light sources when the scene is active.

20 Claims, 9 Drawing Sheets

Related U.S. Application Data

(60) Provisional application No. 62/318,515, filed on Apr. 5, 2016.

(51) Int. Cl.
 *G06F 3/0482* (2013.01)
 *G06F 3/0484* (2013.01)

(52) U.S. Cl.
 CPC ..... *H05B 37/0218* (2013.01); *H05B 37/0227* (2013.01); *G06F 3/0482* (2013.01); *G06F 3/04847* (2013.01)

(58) Field of Classification Search
 USPC .......................................................... 315/130
 See application file for complete search history.

(56) References Cited

U.S. PATENT DOCUMENTS

| | | | |
|---|---|---|---|
| 7,815,338 B2 | 10/2010 | Siemiet et al. | |
| 7,976,196 B2 | 7/2011 | Ivey et al. | |
| 8,093,823 B1 | 1/2012 | Ivey et al. | |
| 8,118,447 B2 | 2/2012 | Simon et al. | |
| 8,247,985 B2 | 8/2012 | Timmermans et al. | |
| 8,282,247 B2 | 10/2012 | Ivey et al. | |
| 8,360,599 B2 | 1/2013 | Ivey et al. | |
| 8,382,327 B2 | 2/2013 | Timmermans et al. | |
| 8,444,292 B2 | 5/2013 | Ivey et al. | |
| 8,454,193 B2 | 6/2013 | Simon et al. | |
| 8,482,212 B1 | 7/2013 | Ivey et al. | |
| 8,523,394 B2 | 9/2013 | Simon et al. | |
| 8,573,813 B2 | 11/2013 | Ivey et al. | |
| 8,596,813 B2 | 12/2013 | Ivey | |
| 8,678,610 B2 | 3/2014 | Simon et al. | |
| 8,807,785 B2 | 8/2014 | Ivey et al. | |
| 8,866,396 B2 | 10/2014 | Timmermans et al. | |
| 8,870,412 B1 | 10/2014 | Timmermans et al. | |
| 8,870,415 B2 | 10/2014 | Ivey | |
| 8,894,430 B2 | 11/2014 | Simon et al. | |
| 8,928,025 B2 | 1/2015 | Simon et al. | |
| 9,006,990 B1 | 4/2015 | Timmermans et al. | |
| 9,006,993 B1 | 4/2015 | Timmermans et al. | |
| 9,072,171 B2 | 6/2015 | Simon | |
| 9,163,794 B2 | 10/2015 | Simon et al. | |
| 9,184,518 B2 | 11/2015 | Ivey et al. | |
| 9,271,367 B2 | 2/2016 | Ivey et al. | |
| 9,730,298 B2 * | 8/2017 | Vangeel | G06F 8/654 |
| 2015/0008845 A1 | 1/2015 | Kim et al. | |
| 2015/0204561 A1 | 7/2015 | Sadwick | |
| 2015/0223308 A1 | 8/2015 | Yen et al. | |
| 2015/0256963 A1 | 9/2015 | Dahlen | |
| 2015/0271899 A1 | 9/2015 | Bosua | |
| 2016/0095188 A1 | 3/2016 | Verberkt | |
| 2016/0095192 A1 * | 3/2016 | Vangeel | G06F 8/654 |
| | | | 315/153 |
| 2016/0242263 A1 * | 8/2016 | Engelen | H05B 37/0245 |
| 2017/0105265 A1 * | 4/2017 | Sadwick | A61N 5/0618 |
| 2017/0206721 A1 | 7/2017 | Koo | |
| 2017/0223811 A1 * | 8/2017 | Vangeel | G06F 8/654 |

OTHER PUBLICATIONS

International Search Report and Written Opinion in International Application No. PCT/US2017/024705, dated Sep. 12, 2017, 20 pages.

Notice of Allowance issued in U.S. Appl. No. 15/393,558, dated Apr. 27, 2018, 6 pages.

\* cited by examiner

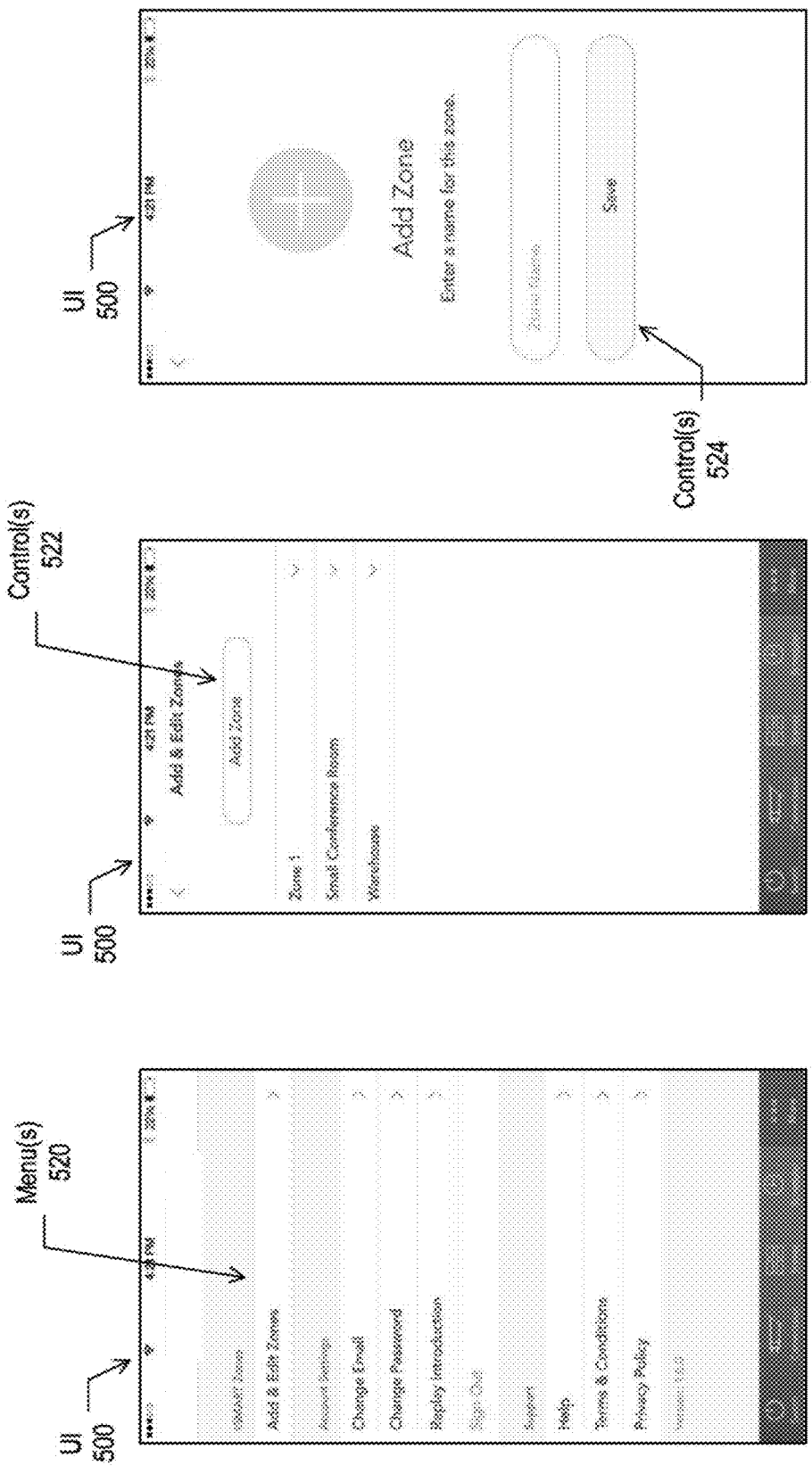

CONNECTED LIGHTING SYSTEM

CROSS-REFERENCE TO RELATED APPLICATION

The present application is a continuation of U.S. patent application Ser. No. 15/393,558, filed Dec. 29, 2016, titled "Connected Lighting System," which claims priority to U.S. Provisional Patent Application No. 62/318,515 filed Apr. 5, 2016, titled "Connected Lighting System." The entirety of all of the prior applications are incorporated by reference into the present application.

BACKGROUND

The lighting controls in a typical commercial space generally provide two settings: on and off. All of the lights in a room may be controlled as a unit from a wall switch, or different banks of lights may be controlled by different dedicated switches. Additionally, the electrical systems in many commercial buildings are not compatible with standard dimmer switches; accordingly, dimming often requires specialized wiring. This can leave some areas over lit while others are under lit. Moreover, lights get left on in unoccupied spaces or someone might find themselves walking into a dark room searching for the switch. Existing lighting control systems often require expensive and disruptive installations and, because of their complexity, they are often disabled or ignored after they are set up. This leaves users with too much or too little light much of the time.

SUMMARY

Implementations of the present disclosure are generally directed to managing a lighting system over a wireless network. More specifically, implementations provide a lighting system that allows for control of each light source (e.g., on, off, or at an intermediate brightness level) independent of other light sources and independent of the electrical wiring of a space. Using the light system, illumination of large spaces may be customized so that each light source lighting the space has an individualized illumination level for each of many different user-defined scenes. In some implementations, one or more light sources may be commissioned, where commissioning includes adding the light sources to a wireless mesh network and to one or more groups. Scenes may be determined that enable the setting of a state (e.g., brightness level) of the light source(s) and/or group(s) of light sources based on wireless signal(s) sent from a controller (e.g., wall switch) that is connected to the wireless mesh network.

The connected lighting system described herein is a network of devices that communicate wirelessly to provide fine-grained and readily configured control of the lighting in an area such as a room, floor of a building, whole building, outdoor space, and so forth. In some implementations, the control of the lighting system may be independent of the electrical scheme in the area, apart from the use of power that may be provided by the area's electrical scheme. The light sources can be controlled independently, allowing variation in the amount of light in various rooms or other areas.

The connected lighting system can eliminate the need for complex and disruptive wiring updates by employing a wireless communication mesh, such as a Bluetooth Low Energy (BTLE) mesh, that enables communication among the devices in the network. Implementations provide for the commissioning and control of individual light sources and/or the commissioning and control of groups of light sources. In some instances, light sources are bulbs (alternatively referred to as lamps) that fit within conventional light fixtures (e.g., via bi-pin connectors, screw connectors, or bayonet connectors), and such light source(s) may be wirelessly connected to daylight and/or occupancy sensors, as well as to multi-scene controllers (e.g., wall switches), allowing for individual control of each light source and/or control of configured groups of light sources. Setup of the system can be performed using a mobile application, and no particular expertise may be required to get the system up and running.

In some implementations, the connected lighting system includes one or more light sources, each including a wireless radio. In some instances, a light source is a bulb, such as a light-emitting diode (LED) bulb, which includes a connector for fitting the bulb to a conventional light fixture. In some instances, the connected lighting system includes one or more light fixtures (alternatively referred to as luminaires), each configured to hold one or more light source. In some embodiments, the light fixture includes a conventional connector for receiving the light source and the light sources may be replaced without replacing the entire fixture. Alternatively, or additionally, the light source(s) may be integral with the fixture. The system may also include one or more controllers (e.g., wall switches) that include electrical connections for connecting with electrical wiring in an area. The controllers may also include a wireless radio for wirelessly communicating with the wireless radios of the light source(s). In instances where the light source(s) are replacement bulb(s) that are installed in light fixtures in the room, the bulb(s) may receive electrical power from the light fixture. The controller(s) may be used to switch the light source(s) among two or more different modes of operation (described below as scenes) based on wireless signals sent from the controller(s).

Implementations of the connected lighting system can include one or more of the following features. For example, the light source(s) can be LED bulbs, e.g., LED replacement bulbs for fluorescent tubes, Edison bulbs, or PAR bulbs. When installed in the room, the light source(s), controller(s), sensor(s), and/or other node(s) can form a mesh wireless network. The wireless radio of each node can be a Bluetooth radio. The connected lighting system can include one or more sensors each including a wireless radio for communicating with the wireless radio(s) of the light source(s) and the wireless radio(s) of the controller(s). The one or more sensors can include a room occupancy sensor and/or light level sensor (e.g., a daylight sensor).

The controller(s) can include a plurality of buttons, switches, and/or other controls to enable a user to select among various available scenes, the scenes having been previously defined by a user using a mobile application. The controller(s) may be configured to send wireless signals to the wireless radios of the light source(s) in response to activation of each of the buttons, and the signals may cause the light sources to enter a state according to the activated button. The buttons of a controller can include an on-off switch and/or a dimmer switch. In some implementations, the buttons include one or more scene buttons associated with pre-programmed configurations in which different light source(s), or different group(s) of light source(s), are operated with different power levels.

Implementations may include methods that include one or more of the following actions:

presenting in a user interface (UI) a representation of a plurality of light sources for which a corresponding wireless advertising signal has been received; in response to detecting a selection through the UI of a first light source from the plurality of light sources, sending a wireless signal to instruct the first light source to provide an indication of its location; receiving through the UI a designation of a group to include the first light source and, in response, adding the first light source to a wireless network; and storing group information indicating that the first light source is in the group.

Implementations may optionally include one or more of the following aspects: the wireless network is a wireless mesh network, e.g., that is compliant with a version of Cambridge Silicon Radio (CSR) mesh network protocol; the light sources include one or more fluorescent tube replacement light-emitting diode (LED) bulbs; the actions further include receiving through the UI scene information indicating that the group is to be set to a designated brightness level when a scene is active; the actions further include sending over the wireless network at least a portion of the scene information to be stored in the memory on the light source; the actions further include sending a wireless scene activation signal over the wireless network to cause the light source to emit the brightness level associated with the scene, wherein the wireless scene activation signal specifies the group and the scene to be activated; the indication includes a flashing of a LED affixed to the light source; and/or the light sources each include a wireless radio that employs Bluetooth Low Energy (BTLE) to send the wireless advertising signal and receive the wireless signal.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations may also include a lighting system that includes: a plurality of light sources, each associated with (e.g., including) a wireless radio for communicating over a wireless network, wherein each of the plurality of light sources stores scene information indicating a state of the respective light source when a scene is active; and a controller including a plurality of switches and a wireless radio for communicating over the wireless network, wherein a switch of the plurality of switches corresponds to the scene, and wherein the wireless radio of the controller emits a wireless scene activation signal over the wireless network in response to a manipulation of the switch, the wireless scene activation signal causing the respective light source to be in the state indicated by the scene information stored on the respective light source.

Implementations may optionally include one or more of the following aspects: the wireless network is a wireless mesh network; the plurality of light sources comprise one or more light-emitting diode (LED) bulbs; the plurality of light sources comprise one or more LED bulbs configured to fit in a conventional light fixture; the actions further include receiving through the UI scene information indicating that the group is to be set to a state when a scene is active; the actions further include sending over the wireless network at least a portion of the scene information to be stored in memory on the first light source; the actions further include sending a wireless scene activation signal over the wireless network; the wireless scene activation signal specifies the scene to be activated; receipt of the wireless scene activation signal causes the first light source to be in the state associated with the scene; the state includes at least one of a brightness, a color, a color temperature, or a number of LEDs for one or more light sources in the group when the scene is active; the indication includes a flashing of a LED affixed to the first light source; the plurality of light sources each includes a wireless radio that employs Bluetooth Low Energy (BTLE) to send the wireless advertising signal and receive the wireless signal; at least one of the plurality of light sources includes a sensor.

Implementations of the present disclosure provide one or more of the following technical advantages and improvements over traditional systems. Implementations allow for the management of a lighting system that includes at least two types of operations that may be performed contemporaneously: adding nodes (e.g., light sources, sensors, controllers, etc.) to a wireless mesh network; and determining the physical location of the nodes for arranging the nodes into groups which may be controllable from a user device or controller. Using this system according to implementations described herein, it is much easy for a user to determine where each light source is physically located based a visual indicator that flashes during the commissioning process (described below). This provides an advantage over traditional systems in which a user may be confronted with a long list of device UUIDs that are advertising through a wireless broadcast signal and, through trial and error, the user must attempt to determine where each node is physically located. Moreover, in some implementations each node stores information indicating what group(s) the node is a member of and what state the node is to be in when particular scene(s) are active. Accordingly, the wireless messages sent to the nodes may include a minimal amount of data, e.g., indicating that Group X is to activate Scene A. Each light source or other node may receive such a message and determine, for itself, how to respond to the message—e.g., whether it is in the specified group and how it is to behave according to the specified scene. Accordingly, implementations provide a technical advantage (e.g., reduced network bandwidth usage) over traditional systems which may be required to send more detailed and lengthy wireless messages.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 5A-5I depict examples of a user interface for managing a lighting system, according to implementations of the present disclosure.

DETAILED DESCRIPTION

Figure 1:
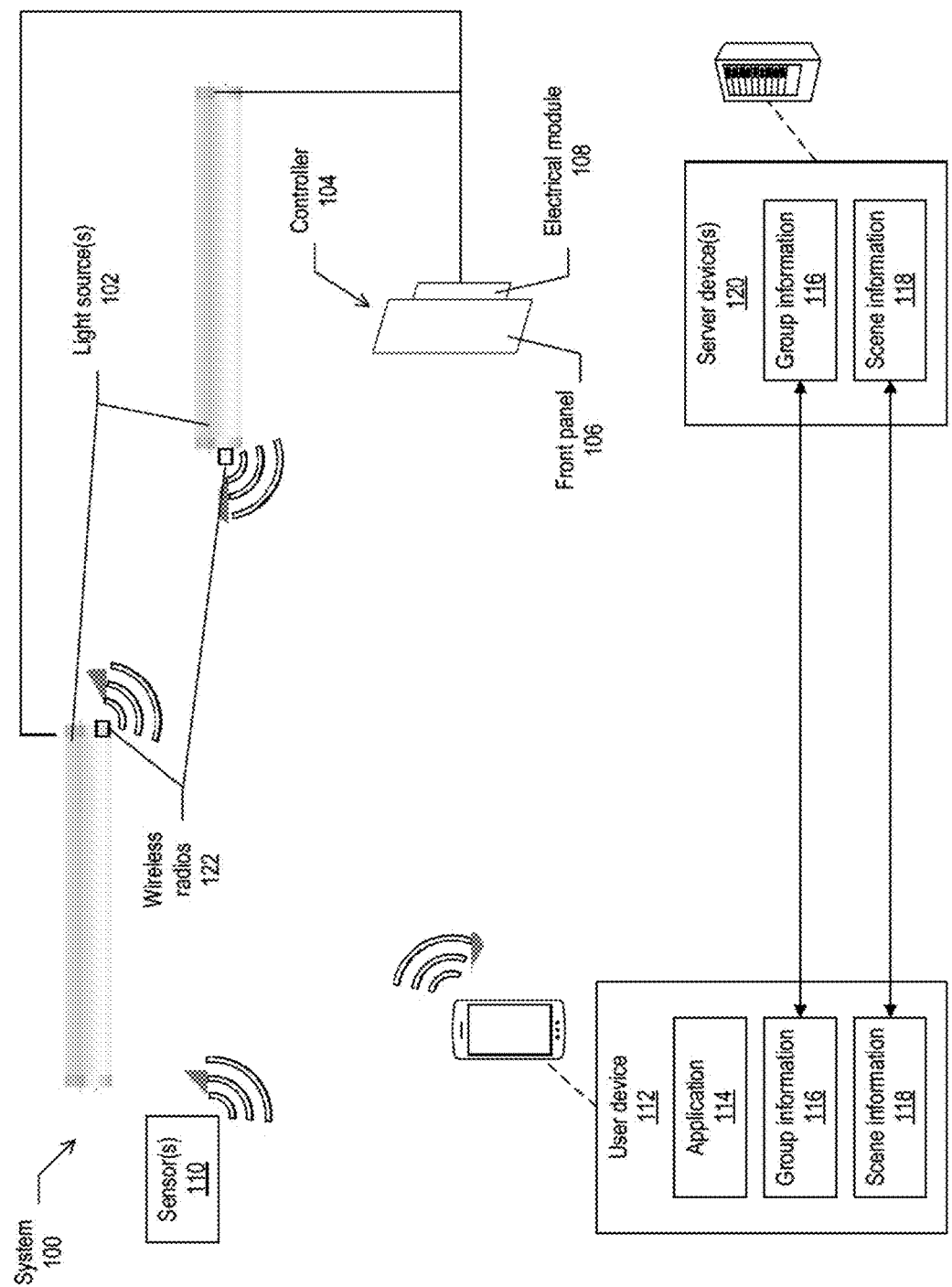
FIG. 1 depicts an example lighting system, according to implementations of the present disclosure.

Implementations of the present disclosure are directed to a lighting system that is connected through a wireless mesh network, such that various light sources are controllable using signals sent over wireless mesh network. As a result, the lighting system allows for control of each light source (e.g., on, off, or at an intermediate brightness level) independent of other light sources and independent of the electrical wiring of a space. Using the lighting system, illumination of large spaces (e.g., spaces that are lit by many separate light sources) may be customized so that each light source lighting the space has an individualized illumination level for each of many different user-defined scenes. Large spaces that may especially benefit from the light system include commercial spaces (e.g., offices), industrial spaces (e.g., warehouses, factories), and other public spaces (e.g., theatres, shopping malls, schools and universities, government buildings).

During a commissioning process, a user interface (UI) of a mobile application executing on a portable device may present a representation (e.g., list) of nodes that are each broadcasting a wireless advertising message. A wireless advertising message may include any suitable type and/or format of message through which a node indicates its presence in an area. In some implementations, a wireless advertising message may be sent in a RF signal. In some implementations, a wireless advertising message may indicate that a node is present in an area and available to be added to a wireless network that employs a particular wireless network protocol. For example, a wireless advertising message may comply with a version of a Bluetooth protocol, and may indicate that the node is capable of communicating over a Bluetooth wireless network and thus available to be added to such a network.

Nodes may include light sources, light fixtures, sensors, controllers, and so forth. In response to a selection of a node through the UI, a wireless message may be sent to instruct the selected node to provide a visual indication of its presence, such as a flashing light. The visual indication may enable a user to discern the physical location of the node in a room, building, or other area. The user may employ the UI to add each node to the mesh network, and to add each node to a group of nodes, e.g., based on the physical location of the node.

The UI may also enable the user to define scenes, where each scene describes how particular light source(s) and/or group(s) of light sources are to operate when the scene is active. For example, a scene may indicate that a first group of light sources is to operate at 50% brightness level while a second group of light sources is to operate at 0% brightness level (e.g., off). Scenes may be activated and/or deactivated from controller(s) (e.g., wall switches), the portable device, and/or other computing device(s). For example, a user may press a button on a controller to activate a first scene that has been defined using the mobile application. In response to the button press, the controller may send a wireless signal to the mesh network of nodes, the wireless signal indicating that the first scene is to be activated. Each node on the network may store information that describes how the node is to operate when the first scene is active. The nodes that are relevant to the first scene may enter the appropriate state of operation (e.g., brightness level) in response to receiving the message.

FIG. 1 depicts an example lighting system 100, according to implementations of the present disclosure. The system 100 may be in an indoor space, such as a room or other portion of a building, or the entire building, an office, a home, and so forth. The system 100 may also be in a space that is at least partly outdoors, such as in a yard, park, stadium, open-air amphitheater, and so forth. The system 100 includes light sources 102, a controller 104, one or more sensors 110, a user device 112, and one or more server devices 120. While two light sources 102 are depicted in FIG. 1, in general, lighting system 100 may include any number of light sources. The controller 104 includes a front panel 106 and an electrical module 108. The user device 112 includes an application 114, group information 116, and scene information 118. The server device(s) 120 include group information 116 and scene information 118. The light sources 102 include wireless radios 122.

The system 100 includes a controller 104, which includes a front panel 106 and an electrical module 108. The electrical module 108 is wired into the electrical system of the area (e.g., the room, building, etc.). In some implementations, the front panel 106 may replace or supplement a conventional light switch that would otherwise be present in the room or other area. As depicted, the controller 104 is a wall switch that is affixed to a wall or other suitable surface. Alternatively, the controller 104 may be a portable controller 104, e.g., a remote control.

In general, each light source is a device configured to emit light (e.g., at least partly in the visible spectrum). Examples of light sources include LED bulb(s), incandescent bulb(s), fluorescent bulb(s), gas lamps and/or other suitable types of light emitting devices. The light source(s) 102 may also include organic LEDs, which use an organic substance as a semiconductor material in a light emitting diode.

Generally, each light source is part of a light fixture (luminaire), through which each light source connects to electrical module 106. The light fixture refers to the light source and all components directly associated with the distribution, positioning, and protection of the light source. Each light fixture may include one or more light source. The light sources may connect to the fixture via a standard bulb connector (in which case the light source may be a replacement bulb) or the light source may be integrally formed with the light fixture. Standard bulbs may include, but are not limited to, fluorescent (e.g., T8) bulbs, Edison bulbs, parabolic aluminized reflector (PAR) bulbs, and so forth.

The user device 112 may be any suitable type of computing device. In some instances, the user device 112 is a mobile and/or portable computing device such as a smartphone, tablet computer, wearable computer (e.g., watch computer, glasses computer, etc.), and so forth. In some instances, the user device 112 is a less portable type of computing device, such as a desktop computer, laptop computer, and so forth. The server device(s) 120 may include any suitable number and type of computing device.

In some instances, the server device(s) 120 are distributed computing device(s) (e.g., cloud server(s)).

As depicted in FIG. 1, light sources 102 are both in the form of a tube (e.g., a fluorescent tube or an LED fluorescent replacement tube). Each light source 102 may include an internal driver that regulates and/or modulates the light source's brightness, or otherwise controls the state of the light source. Examples of LED light sources 102 for fluorescent tube replacement and associated manufacturing methods are described further in U.S. Pat. Nos. 7,049,761; 7,510,299; 7,815,338; 7,976,196; 8,118,447; 8,093,823; 8,247,985; 8,282,247; 8,360,599; 8,382,327; 8,444,292; 8,454,193; 8,482,212; 8,523,394; 8,573,813; 8,596,813; 8,678,610; 8,807,785; 8,870,415; 8,870,412; 8,866,396; 8,894,430; 8,928,025; 9,006,990; 9,006,993; 9,072,171; 9,163,794; 9,184,518; and 9,271,367; the entire contents of each of these patents are incorporated herein by reference.

Generally, all of the light sources in lighting system 100 may have the same form factor (e.g., all tubes, as depicted in FIG. 1) or different form factors can be used in the same system. For example, in some embodiments, some of the light sources are tubes while others are PAR bulbs and/or Edison bulbs. Lighting system 100 can also include only light fixtures for replacement bulbs, only light fixtures with integrated light sources, or both types of light fixture.

In addition to an internal driver, each light source 102 is associated with a wireless radio 122 (e.g., transceiver) that allows the light source to receive and transmit wireless signals. The wireless radio may be integrally formed with the light source or otherwise in communication (e.g., electrical or wireless communication) with the associated light source. The wireless radio may be in communication with the internal driver, allowing the operation of the light source to be wirelessly controlled as described herein. In some embodiments where light source 101 is a replacement bulb, the wireless radio is included as part of the electrical components in the replacement bulb. In certain embodiments, the wireless radio is part of a light fixture that may be configured to receive replacement bulbs, or may have light sources integrated therein.

In some implementations, the electrical module 108 closes the circuit delivering electrical power from the area's electrical system to the fixtures housing the light source(s) 102, e.g., in instances where the light source(s) include bulb(s) that are installed into fixture(s), so that at least some (or all) of the light sources 102 in the light fixtures always receive electrical power. This is unlike a conventional wall switch, which opens or closes the circuit to turn lights off or on.

Electrical module 108 may also include a wireless radio (e.g., transceiver), allowing for wireless communication between the controller 104 and the light source(s) 102. During operation, the light source(s) 102 may be controlled from the controller 104 over the wireless network. In particular, operating the various switches on the front panel 106 may cause the controller 104 to send wireless signals to the wireless radios of the light sources 102, causing one or more of the light source(s) 102 to modify their brightness setting as appropriate. For example, all the light source(s) 102 in the system 100 may be switched on or off using on-off switch 202 of the front panel 106. The light source(s) 102 may be collectively dimmed or brightened using the dimmer switches 204 of the front panel 106. The light source(s) 102 may be adjusted between different scene settings using the scene switches 206 of the front panel 106.

The system 100 may also include one or more sensors 110. The sensor(s) 110 may include a wireless radio (e.g., transceiver) for communication with the light source(s) 102 and/or controller 104. Implementations support the use of any suitable number and type of sensor(s) 110. For example, the sensor(s) 110 may include motion, sound, and/or heat sensors that determine when an area (e.g., a room) is occupied by individual(s). The sensor(s) 110 may also include light level sensor(s) that detect the brightness of ambient light in the area. In some implementations, the operation of the light sources 102 may be modified based on wireless signals from a sensor 110, e.g., based on ambient light level(s) and/or area occupancy. For example, the light sources 102 can be switched on or off, or dimmed or brightened, based on signals from an occupancy sensor 110, where such signals are sent based on whether someone is in a room or whether the room is unoccupied. As another example, the light sources 102 can be switched on or off, or dimmed or brightened, based on signals from an ambient light sensor, where such signals are sent based on the amount of ambient light detected in the area. In some implementations, at least one of the light sources 102 may include one or more of the sensors 110, such as occupancy sensor(s), ambient light level sensor(s), and so forth. The sensor(s) 110 may also be external to the light source(s) 102, as shown in the example of FIG. 1.

Any suitable wireless communications protocol may be used. For example, the wireless radios may be configured to operate using any suitable version of wireless DALI, IEEE 802.11, Wi-Fi, Bluetooth, Bluetooth Low Energy (BTLE). The wireless radios may operate using radio frequency (RF) channel(s), or through infrared, ultrasonic or modulated visible light, such as light emitted from the LED bulbs with high frequency modulation. The wireless radios in the light sources 102, controller 104, sensor(s) 110, and/or other node(s) may form a wireless mesh network that extends the range of the wireless communication system over the entire area (e.g., an entire room, building, etc.). This can be beneficial in large rooms, such as storage warehouses, where the extent of the space to be lit can exceed the range of the wireless communication protocol being used. For example, Bluetooth communications may have a range of up to 30 feet, and the wireless mesh network may enable communications over significantly longer distances.

While the example system 100 in FIG. 1 is depicted as including a single controller 104, a single sensor 10, and two light sources 102, other configurations are also possible. For example, the system 100 can include any suitable number of light sources 102 and, provided each light source 102 is in range of another wireless radio in the mesh network, the light source 102 can be configured to operate as part of the system 100. Multiple sensors 110 and/or multiple controllers 104 can also be used. Moreover, although examples herein may describe light sources 102 as bulbs that are fluorescent replacement tubes, other bulb form factors are also possible. For example, A-series bulbs, B-series bulbs, C-7/F series bulbs, MR series, and/or PAR bulbs can also be used.

The system 100 may also include a user device 112. The user device 112 may be a portable and/or handheld device, such as a smartphone, tablet computer, wearable computer, implanted computer, mobile gaming platform, and so forth. The user device 112 may also include any other suitable type of computing device. The user device 112 may include a wireless radio (e.g., transceiver) that enable the user device 112 to communicate using the same wireless communication protocol as the light source(s) 102, the sensor(s), the controller(s) 104, and/or the other node(s) in the system 100. Accordingly, the user device 112 may be used to control and/or configure the operation of the light sources 102 in the lighting system 100. In some implementations, the user device 112 may execute an application 114 (e.g., an app) that enables the operation and/or configuration of the light sources 102 in the system 100. The application 114 can include a user interface (UI) that may be manipulated through a touchscreen or other input components of the user device 112. The UI may, in some instances, imitate the layout of the switches on the controller 104. In this way, a user can operate the connected lighting system 100 using the user device 112 in a manner that is the same or similar to the way in which the user would use the controller 104.

In some implementations, the application 114 is configured to enable a user to commission the node(s) of the connected lighting system 100, and to configure the system 100 for different scenes to be activated using the scene buttons of the application's UI and/or the controller's front panel 106. In some implementations, the first step in configuring system 100 is for the application 114 to identify each available light source 102 or other node on the network and present a list or other representation of available light sources 102 or other nodes to the user. In some implementations, an identification protocol can be used for the user to identify each light source 102 from the detected light sources 102 presented in the UI of the application 114. For example, each light source 102 can flash or provide some other indication when its corresponding identifier (e.g., serial number or other identifier) is selected (e.g., tapped) in the UI.

The user can use the application 114 to assign one or more light sources 102 to a group. For example, the bulbs that are installed in the same troffer can be assigned to one group. As another example, the light sources 102 that are installed in a common area of a room may be assigned to a group. As another example, the light sources 102 that are near windows in one or more rooms may be assigned to one group, and the light sources 102 that are in the interior of the room(s) (e.g., farther from windows) may be assigned to another group. Accordingly, a group may be described as a collection of one or more light sources 102 that may or may not be physically adjacent or proximal to one another. The user's specification of one or more groups may be saved as group information 116 in persistent storage on the user device 112.

The user may also use the application 114 to specify one or more scenes, where each scene specifies a state of one or more light sources 102 and/or groups of light source(s) 102 when the scene is active. A scene may specify a state of light source(s) 102 and/or group(s) of light source(s) 102 that includes one or more characteristics that the light source(s) 102 are to assume, such as a brightness level (e.g., power level), color, color temperature, and/or other characteristic(s) of the light source(s). In some instances, a light source 102 may include multiple LEDs or other sub-components which may be independently illuminated or not illuminated by a light source. In such instances, the state may specify a characteristic of a number of LEDs that are to be illuminated by the light source while the scene is active. Scenes provide for easy customization of lighting to the user's desired light level(s) in the area. For example, in one scene, the group of light sources 102 located near windows can be set to lower power levels (e.g., lower brightness) than light sources installed further from the windows, when there is ambient light provided by the windows. As another example, in a lecture hall or other public space, in a first scene the entire hall can be well lit (e.g., for when the audience is being seated or leaving), and in a second scene the audience lighting can be dimmed while the lighting at the podium or stage is increased. Once the scenes are programmed using the application 114 on the user device 112, the lighting in a room or other area can be readily switched between different scenes using the scene buttons on the controller 104. In some implementations, the application 114 may also be used to switch between scenes. The user's specification of one or more scenes may be saved as scene information 118 in persistent storage on the user device 112.

Scene information 118 may include an identifier of the scene (e.g., "Scene 1") as well as the state that the light source(s) are to assume when the scene is active. As described above, a state may include characteristic(s) such as a brightness level (e.g., power level), color, color temperature, number of LEDs to be illuminated, and so forth.

The system 100 may also include one or more server devices 120. The server device(s) 120 may include any suitable number and type of computing device, including distributed computing device(s) (e.g., cloud server(s)). The server device(s) 120 may communicated with the user device 112 over one or more network(s), e.g., over the internet. In some implementations, the group information 116 and/or the scene information 118 may be stored in persistent storage on the server device(s) 120 in addition to or instead of being persistently stored on the user device 112. The group information 116 and/or scene information 118 may be periodically synced between the user device 112 and/or server device(s) 120.

In some implementations, BTLE may be used for communications between the user device 112, controller(s) 104, sensor(s) 110, and light sources 102. A Cambridge Silicon Radio (CSR) Mesh network, or other suitable mesh-based communications protocol, may sit on top of BTLE and enable communications over a wider range than is possible using BTLE alone, as described above. Various messages may be sent over the mesh network to enable control of the light sources 102. For examples, messages may be sent to control brightness of light sources 102, define scenes, activate scenes, and so forth. For example, a whole building may be encompassed by a mesh network, and various groups could be defined to address individual rooms or other portions of the building. In general, a group may be defined to include any logical portion of a building, room, or other area. Different sets of light sources 102 may be defined as different groups, and a scene may be defined to indicate how the various light source(s) 102 and/or group(s) function when that scene is active. The application 114 and/or controller 104 may be used to activate and/or deactivate the various previously defined scenes.

In some implementations, the system 100 may include a learning component that adjusts the lighting based on learned aspects of individual behavior. For example, the learning component may receive sensor data from the sensor(s) 110 indicating when an area is occupied by one or more persons and/or when the ambient light in an area is at a particular level. As a particular example, the learning component may determine that an individual tends to enter an area (e.g., room, building, etc.) at approximately 7:13 a.m. each Wednesday. The lighting environment may be automatically adjusted accordingly, to ensure that there is adequate light in an area when the individual arrives.

In some implementations, the system 100 takes into account the level of ambient light (e.g., available from daylight), as well as a user-selected dimming setting, to determine a power level and/or brightness at which to operate the light sources. In some implementations, the level settings for light source(s) may be adjusted over time based on user inputs. Accordingly, the learning component may learn the lighting levels preferred by the user at various times of the day (or days of the week, month, etc.), and automatically adjust to provide the lighting levels adapted by the particular user. Moreover, in some implementations the learning component may take into account power savings considerations when determining the level(s) of light source(s) at various times. For example, the learning component may recognize patterns of when a user is present or not present in a particular space. Light source(s) may be turned off and/or set to a reduced brightness level at those times when the user is not likely to be present, and/or light source(s) may be turned on and/or set to a typical brightness level for room usage at those times when the user is likely to be present, as determined based on the previously detected patterns.

In some implementations, at least a portion of the scene information 118 may be stored on one or more light sources 102 in the system 100. For example, a particular light source 102 may store information indicating how it is to operate (e.g., its state) when various scenes are active, such as whether the light source is to be on, off, and/or the power or brightness level it is to emit. For example, for Scene 1 a particular Light Source A may be off and for Scene 2 Light Source A may be at 50% power level. In some implementations, a light source 102 may store information regarding its own state when a scene is active, but may not store information regarding the state of other light source(s) when the scene is active. Implementations may store scene information 118 for the various light source(s) 102 on the light source(s) themselves to limit the amount of bandwidth needed for the messages that activate scenes. This may be particularly advantageous for those implementations that employ a limited bandwidth wireless communication protocol such as BTLE. For example, a wireless scene activation message may be sent over the wireless mesh network, and received by all the light sources in the network. The wireless scene activation message may indicate that a particular scene is to be activated. On receiving the message, each light source may determine based on its stared scene information how it is to respond to the wireless scene activation message, and the light source may assume the appropriate state (e.g., brightness, color, color temperature, etc.) according to its stored scene information.

In some implementations, at least a portion of group information 116 and/or scene information 118 may be stored on the light source(s) 102. A wireless scene activation message may be sent, from the user device 112 and/or controller 104, to activate a particular scene in an area. The message may be received by each of the nodes (e.g., light source(s) 102) in the mesh network, and each node may determine how it is to respond to the message given its stored group and/or scene information. For example, a message may be sent indicating that Group A is to activate Scene X. Light Source 1 may determine, based on its stored group information, that it is a member of Group A. Light Source 1 may determine, based on its stored scene information, that Scene X includes setting Light Source 1 at 100% power level. Accordingly, in response to the message the internal driver of Light Source 1 may set the light source's power level to 100%, if it is not already at 100%. Light Source 2 may receive the same message and also determine that it is a member of Group A. Light Source 2 may determine that Scene X includes setting Light Source 2 to 25% power level, and the internal driver of Light Source 2 may set the light source's power level accordingly. Light Source 3 may receive the same message and determine that it is not a member of Group A. In response to this determination, the internal driver may take no action. In some implementations, the messages may be communicated to the light sources 102 on the mesh network through wireless signal(s) sent from the controller 104. In some implementations, the signal(s) may be sent from the user device 112 if the user device 112 is in range of the mesh network.

In some implementations, each light source 102, sensor 110, controller 104, user device 112, and/or other nodes may each have a unique address (e.g., BlueTooth address) on the mesh network. A message may be broadcast to the entire mesh network, and the message may be addressed to a particular light source 102 or group of light source(s) 102. For a message addressed to a particular light source 102, the light source 102 may recognize its address and respond appropriately according to the contents of the message. For a message address to a group of light source(s) 102, each light source may determine whether it is part of the group and, if so, the light source may respond appropriately according to the contents of the message. Because each light source 102 stores information indicating what group(s) it is in and the state it is to be in when a scene is active, the messages may include a minimal amount of data. For example, a message may include minimal data indicating that Group X is to activate Scene A, and each light source 102 in the mesh network can determine for itself how to respond to such a message.

Figure 2:
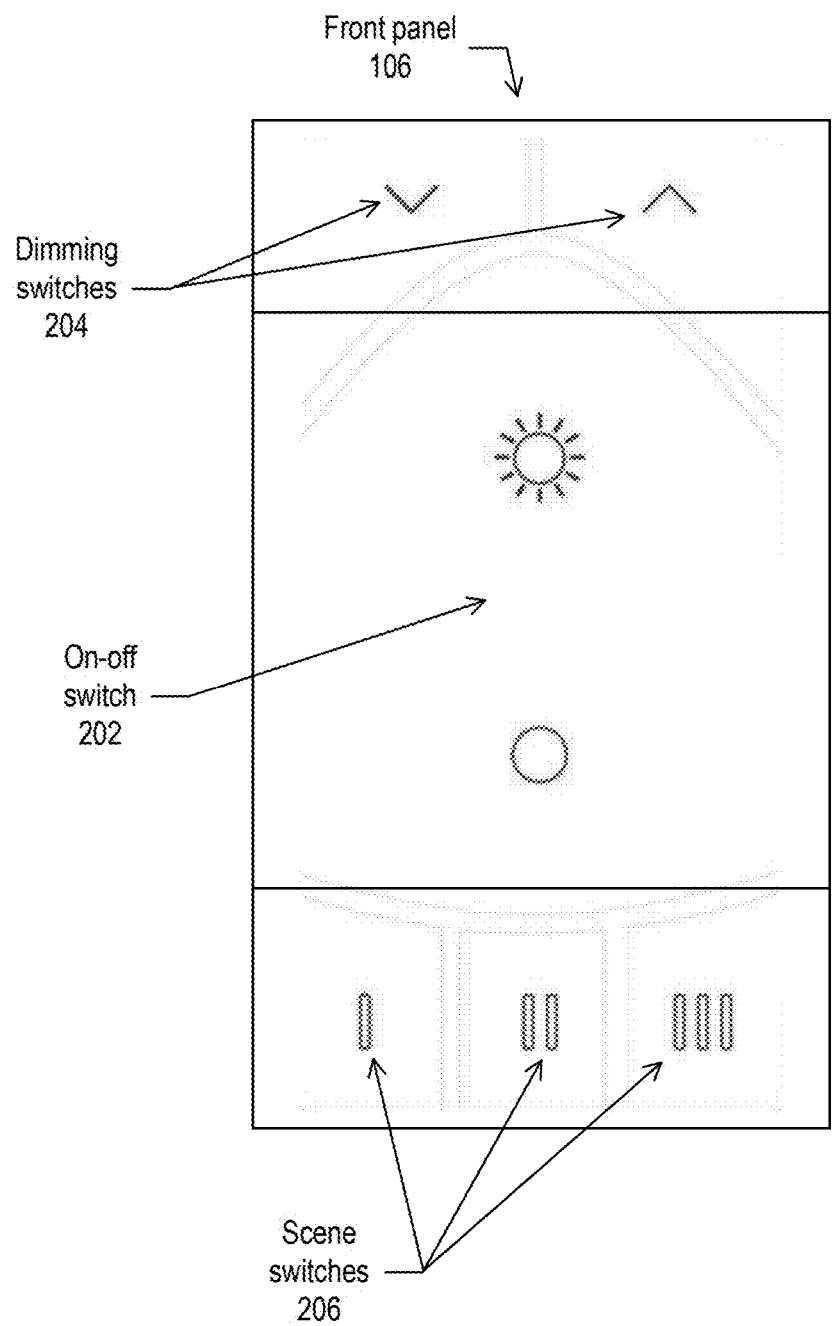
FIG. 2 depicts an example front panel of a controller, according to implementations of the present disclosure.

FIG. 2 depicts an example front panel 106 of a controller 104, according to implementations of the present disclosure. As shown in FIG. 2, the front panel 106 includes an on-off switch 202, dimming switches 204, and/or scene switches 206. The on-off switch 202 may be operated by a user to turn on, or turn off, one or more light sources. The dimming switches 204 may be operated to decrease or increase the level of light emitted by one or more light sources. The scene switches 206 may correspond to various different settings, called scenes, as described herein. Such scenes may be defined by a user through a mobile application. The scene switches 206 may be operated by the user to select one of the previously specified scenes. Selection of a scene may cause a signal to be sent to instruct one or more light sources to enter the appropriate state according to the selected scene. The front panel 106 may include any suitable number of switches each corresponding to a scene. In the example shown, the front panel 106 include three switches 206 that correspond to three different scenes. In some implementations, one or more of the switches of the front panel 106 may be capacitive touch switches. Implementations also support the use of other types of switches. For example, the front panel 106 may include one or more touchscreen displays in which the switches are presented as UI elements. In such implementations, manipulation of the switches may include the user touching or otherwise gesturing on the touchscreen(s).

Figure 3:
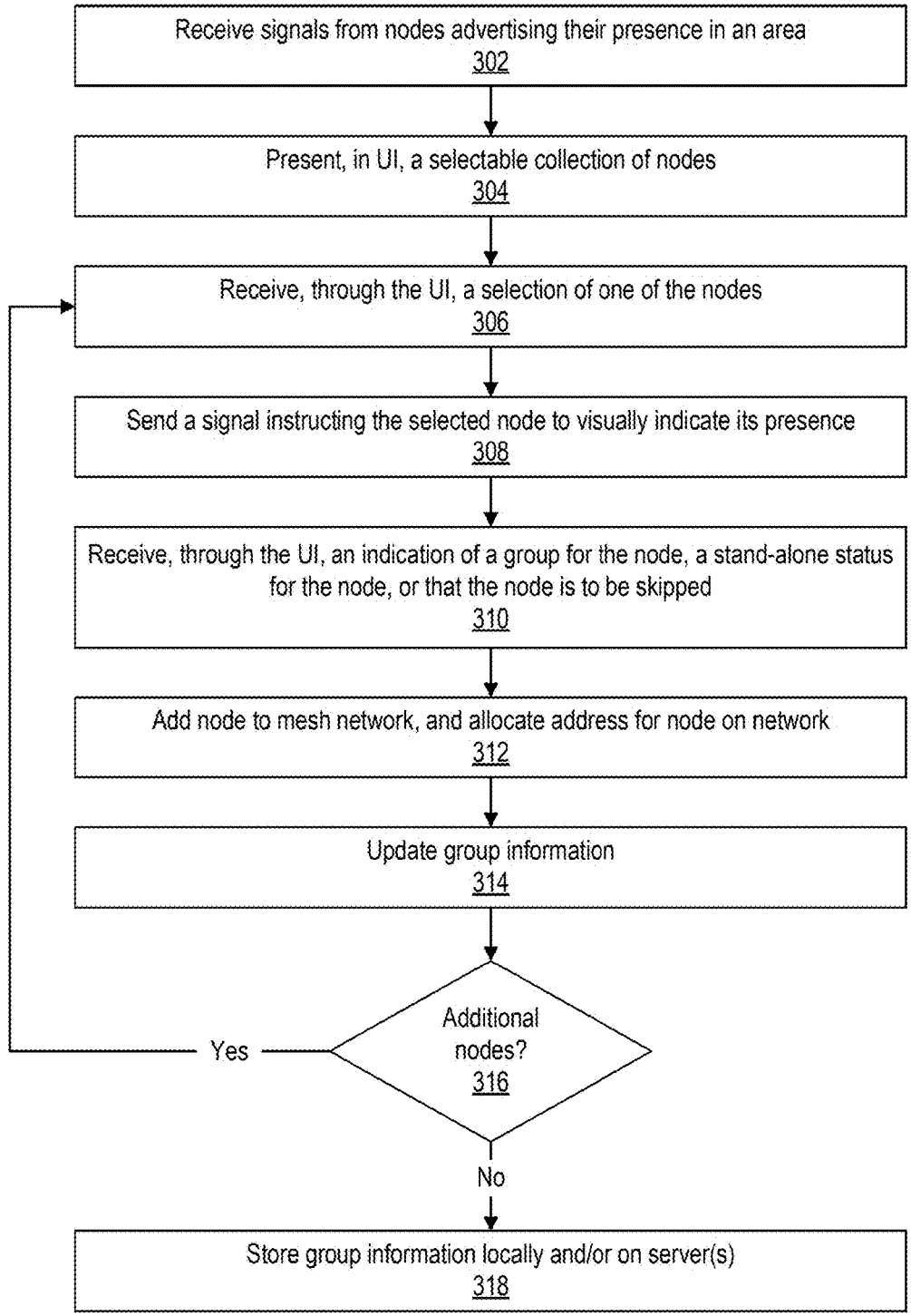
FIG. 3 depicts a flow diagram of an example process for commissioning nodes (e.g., light sources) in a wireless mesh network, according to implementations of the present disclosure.

FIG. 3 depicts a flow diagram of an example process for commissioning nodes (e.g., light sources 102 and/or sensors 110) in a wireless mesh network, according to implementations of the present disclosure. Operations of the process may be performed by the application 114 and/or other software executing on the user device 112, the controller 104, the server device(s) 120, or elsewhere.

Commissioning is a process by which light sources 102, sensors 110, and/or other nodes with wireless (e.g., BTLE supporting) transceivers may be identified, assigned a network address, and added to the network. Commissioning may also include physically locating the node(s) in the area. In some implementations, commissioning may be a setup phase in which a user identifies: the various nodes (light sources 102 and/or sensors 110) that have been installed in an area, such as a room or other portion of a building; identifies the physical location of each node; and assigns nodes to various groups. The nodes may also include any appropriate number of controllers 104 (e.g., switches). An object of the commissioning process may be to add the various nodes to a mesh network that is also accessible to the user device 112, to enable control of the lighting system 100 through the user device 112 and/or controller 104. Another object of the commissioning process may be to physically locate the various nodes in an area, e.g., light sources are in the back half or front half of room, positioned to light up a conference table, near or far from windows, and so forth. Such locating may enable the user to define scenes to efficiently manage the lighting in an area.

Signals may be received (302) from the various nodes in an area. In some implementations, the signals may be received through a wireless transceiver of the user device 112. The signals may be the various nodes advertising their presence, and each signal may include a unique identifier (e.g., UUID) of the node that sent the signal. At this stage, the nodes may not yet be on the mesh network.

The UI of the application 114 may present (304) a collection (e.g., list, stack, or other graphical representation) of the various nodes from which signals have been received. In some implementations, the list or other graphical representation may be selectable, such that a user may select various nodes that are presented in the UI.

A selection of one of the nodes may be received (306) through the UI. In response to the selection, a signal may be sent (308) (e.g., from the user device 112) instructing the selected node to indicate its presence. The signal may include the unique identifier (e.g., UUID) of the selected node. In response to receiving the signal, the node may indicate its presence visually or otherwise. In some implementations, the node may flash or otherwise illuminate a LED one or more times to indicate the node's presence and enable the user to perceive the physical location of the node. In some implementations, for nodes that are light sources, the light source itself may flash on and off one or more times to indicate its presence and location in the area. In some implementations, the UI may present a virtual stack of nodes such as light sources, in a selectable UI element that may resemble a stack of playing cards or other objects. The UI may enable the user to select the top node in the stack, and the selected node may be sent the signal to cause the node to indicate its presence by flashing a LED or otherwise. Thus, in some implementations the user may select one node at a time to be added to the mesh network and/or added to a group.

Based on the location of the node in a zone, the user may use the UI to add the node to at least one group or designate the node as a stand-alone node (as described below). An indication may be received (310) that the node is to be associated with the group(s), or designated as a stand-alone node, as indicated by the user through the UI. In some implementations, the UI may provide a control to let the user skip the commissioning of a node if the user prefers to add the node to a group at a later time, and/or if the user prefers to not add the node to the mesh network at this time. For example, the particular node may be in a different room than where the user is currently located, and the user may prefer to add the node to a group later when they are in the same room as the node. Skipping a node may include adding a node to a group of hidden devices, as described further below.

The selected node may be added (312) to the mesh network, which may include allocating a network address for the node. The network address may uniquely identify the node on the network. In some implementations, adding the node to the network may employ a security mechanism. For example, an exchange of cryptographic keys may be performed between the application 114 and the node. The user device 112 may store a key (e.g., a public key) for the network it is creating, and the user device 112 may send this key to each node that is added to the network. In subsequent communications over the network, the node may employ the public key. In general, the allocated network address for the node may be shorter than the unique identifier that the node originally included in its advertising broadcast message. In some implementations, security may be provided at least partly through use of the mesh network itself. For example, physical proximity to the other nodes (e.g., light sources) may be required for a device to participate as a node on the network.

The group information 116 may be updated (314) to indicate that the selected node is to be a member of the indicated group, that the selected node is designated as a stand-alone node, or that the selected node has been skipped for the time being (e.g., added to hidden devices). Although examples herein may describe a particular node as being a member of a single group, implementations are not so limited. In some implementations, a node may be a member of any suitable number of groups, or no group. For example, a light source 102 in a conference room may be a member of a first group of all the light sources in the conference room, and the light source 102 may also be a member of a second group that includes those light sources situated to light a conference table in the room.

Once the node has been added to the network and assigned to group(s) (or skipped, or designated as stand-alone), a determination may be made (316) whether there are additional nodes to be added to the network. If so, the process may return to 306 and process another node selected through the UI. If not, the group information 116 may be stored on the user device 112, the server device(s) 120, and/or other device(s).

Although examples herein may describe using a flashing light to allow a user to perceive the physical location of a node, implementations are not limited to this particular technique for determining the location of a node. In some implementations, the location of a node may be determined based on a user moving their user device 112 to a location under, next to, or otherwise near a node. The location determination components of the user device 112, such as a RF transceiver and Global Positioning System (GPS) signal-processing software, may be employed to determine that the location of the node is approximately the current location of the user device 112. In some implementations, a signal strength and/or direction of the advertising signal sent from the node may be employed to determine a location of the node, e.g., through triangulation based on detection of the signal at multiple receivers. In some implementations, the user may employ a laser pointer or other indicator to point to a node and indicate its location.

In some implementations, the nodes may be initially sorted and/or filtered to optimize the process of identifying node locations and adding nodes to groups. For example, based on the strength of the advertising signals received at the user device 112, the application 114 may identify those nodes that are in proximity to the user device 112 (e.g., in the same room as the user device 114 and/or user). The application 114 may present those nodes for location identification and grouping first, with priority over other nodes that may be farther away or in other rooms. This may provide for a commissioning and grouping process that is more efficient, by enabling the user to identify and group-assign those nodes that are most relevant based on the user's current location, e.g., instead of requiring the user to skip those nodes that are located in other rooms. As the user moves between various rooms or other locations, the application 114 may present those nodes that are proximal to the user's current location. This sorting provides a more positive user experience than if the user were required to skip many nodes at the beginning of the commissioning process.

In some implementations, the commissioning and/or group assignment of nodes may be at least partly automated. For example, using a camera in the user device 112 the application 114 may automatically determine the location of a node based on its flashing light pattern, and in some instances automatically allocate the node to a group based on its location. In some implementations, the nodes themselves may include location determination capability, such as hardware and/or software components for location determination based on GPS signals. In such instances, the nodes themselves may indicate their locations to the application 114.

In some implementations, commissioning may be performed more quickly and/or efficiently through at least partial parallel processing of each node (e.g., contemporaneous performance of at least some of the steps in FIG. 3). For example, one or more next nodes may be queued up and presented in the UI for sorting into groups while previous node(s) are still being allocated network addresses, being added to the network, and/or being added to group(s).

Figure 4:
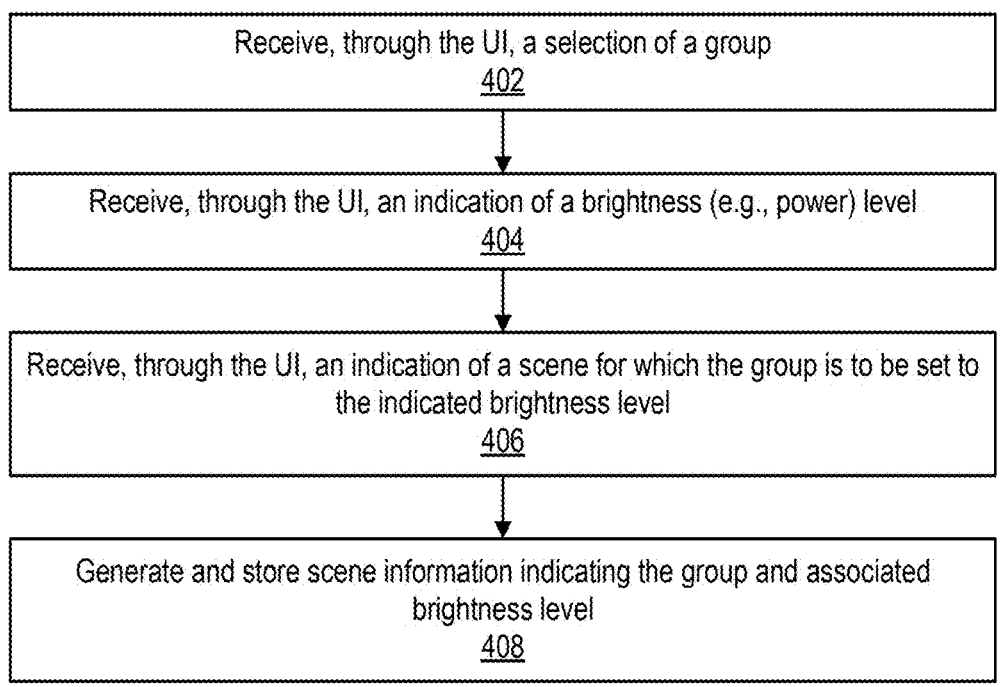
FIG. 4 depicts a flow diagram of an example process for determining scene information for a lighting system, according to implementations of the present disclosure.

FIG. 4 depicts a flow diagram of an example process for determining scene information for a lighting system 100, according to implementations of the present disclosure. Operations of the process may be performed by the application 114 and/or other software executing on the user device 112, the controller 104, the server device(s) 120, or elsewhere.

A selection of a group may be received (402) through the UI of the application 114. An indication of a brightness level (e.g., power level) may also be received (404). An indication of a scene may be received (406) through the UI, indicating that the scene is to include the selected group of light sources 102 set to the indicated brightness level. Scene information 118 may be generated and stored (408) to indicate that the scene includes the group set to the associated brightness level. As described above, the scene information 118 may be stored on the user device 112 and/or the server device(s) 120. As described above, at least a portion of the group information 116 and/or scene information 118 may also be stored on each of the light source(s) 102, such that each light source stores information indicating which group(s) include the light source and the state that the light source is to be in when various scene(s) are active. Such storage may include sending a message over the wireless mesh network, the message being addressed to the particular light source 102 and the message including the portion of the group information 116 and/or scene information 118 to be stored on the light source 102.

Scenes may include any suitable number of groups of light sources 102, and/or individual light source(s) 102, with each group or light source set to a particular brightness level when the scene is active. In some implementations, the brightness level may be expressed as a percentage of the maximum power consumable by the light source and/or a percentage of the maximum brightness level that the light source is capable of emitting. For example, a brightness level may vary from 0% to 100%, where 0% is the light source operated at zero power (e.g., the light source is not emitting any light and/or not consuming any power) and where 100% is the light source operating at its maximum power, emitting the maximum amount of light possible given the particular configuration of the light source. Implementations also support the use of other formats for expressing brightness level of the light source(s) 102.

In some implementations, a scene may be defined to include various rules based on environmental characteristics, time, and/or other variables. For example, a scene may be specified to be activated or deactivated on particular day(s) of the week, month, year, range(s) of days, and/or time period(s) during one or more days. As another example, a scene may be specified to be activated or deactivated if a particular area (e.g., room, building, etc.) is occupied or unoccupied. As another example, a scene may be specified to be activated or deactivated based on a level of ambient light in an area, e.g., whether there is natural light or a lack of natural light, in daytime or nighttime.

Storage of group information 116 and/or scene information on the server device(s) 120 may facilitate the later editing of group(s) and/or scene(s) by the user on the user device 112 or some other device. A user may employ the application 114 to modify group(s) and/or scene(s), add or delete group(s) and/or scene(s), and/or otherwise manage the lighting system. Light source(s) and/or other node(s) that are incorporated into the area after the initial commissioning may be commissioned and added to the mesh network and assigned to groups as described above.

The nodes which may be added to the mesh network may include light source(s) 102, sensor(s) 110, controller(s) 104, and/or other types of node(s). The sensor(s) 110 may include occupancy sensor(s), such as motion sensor(s) to detect the presence (or absence) of individuals (or other moving entities) in an area. Sensor(s) 110 may also include ambient light sensor(s) to detect an amount of light in an area, e.g., natural light and/or light emitted by light source(s) 102. Sensor(s) 110 may also include any other suitable type of sensor that is configured to detect an environmental condition in proximity to the sensor, such as air quality sensors, wind speed sensors, air pressure sensors, noise/sound detectors, temperature sensors, and so forth. The controller(s) 104 may include wall-mounted controller(s) (e.g., switches) and/or portable controller(s) as described above. In some implementations, other types of node(s) may be supported. For example, node(s) may include an energy monitor that detects the amount of power or energy being consumed by one or more node(s) in the system. Such monitor(s) may facilitate load shedding, power usage optimization, and/or other actions to conserve power generally. In some implementations, node(s) may include luminaires or other fixtures that house the light source(s), or other types of devices.

In some implementations, the application 114 and/or other software executing on the user device 112, server device(s) 120, controller 104, or elsewhere may receive data from the network regarding energy usage, and may analyze the data to determine ways in which energy usage may be optimized and/or energy conserved generally. For example, the energy usage data may be analyzed to determine how and whether energy may be saved through daylight harvesting, modification of groups and/or scenes, time of use patterns, and/or other changes to the lighting system. The analyzing module may access information regarding a state of the system at any given time, such as which scene(s) are active, the brightness levels of various light sources, and so forth.

Based on the state information, a determination may be made of how much power is being consumed at any given time. Implementations may employ machine learning algorithms and/or techniques to determine groups, scenes, and/or schedules to optimize energy usage, best take advantage of natural light, and so forth. Such machine learning may build and/or adjust lighting schedules based on usage patterns and/or occupancy patterns detected in an area. For example, based on a detected pattern that an individual tends to use a particular room (e.g., office) between 8:00 a.m. and 6:00 p.m. on weekdays, the machine learning may create a timing-dependent scene to ensure that the lighting is adequate in that room during the predicted times of occupancy, while setting the brightness level of the light source(s) 102 in the room to account for the amount of natural light which may be present at any given time.

In some implementations, the operation of particular fixtures and/or light sources may be optimized to achieve efficient energy usage. For example, a fixture may include multiple light sources, and a determination may be made that it is more efficient to operate half the light sources at 100% brightness instead of operating all the light sources at 50% brightness, to achieve overall 50% brightness for the fixture. As another example, a scene may specify that a "night light" is to be left on overnight, e.g., a single light source in a particular room or other area. Implementations may optimize this scene such that a different light source is left on during different nights, to ensure that a single light source does not burn out significantly faster than other light sources.

In some implementations, the server device(s) 120, user device 112, controller(s) 104, and/or other device(s) may provide an interface to enable a user to view information regarding the current state of the lighting system, usage history, energy usage patterns, analytics, group and/or scene information, schedule information, and so forth. Such an interface may be secured against unauthorized access by requiring a user to enter credentials to authenticate the user and verify their identity an authorization to access the information. The interface may be accessible to user(s) over a network. In some implementations, the interface may be a web interface presented in a web browser.

FIGS. 5A-5I depict examples of a UI 500 for managing a lighting system 100, according to implementations of the present disclosure. In some implementations, the UI 500 may be presented by application 114.

Figures 5A, 5B:
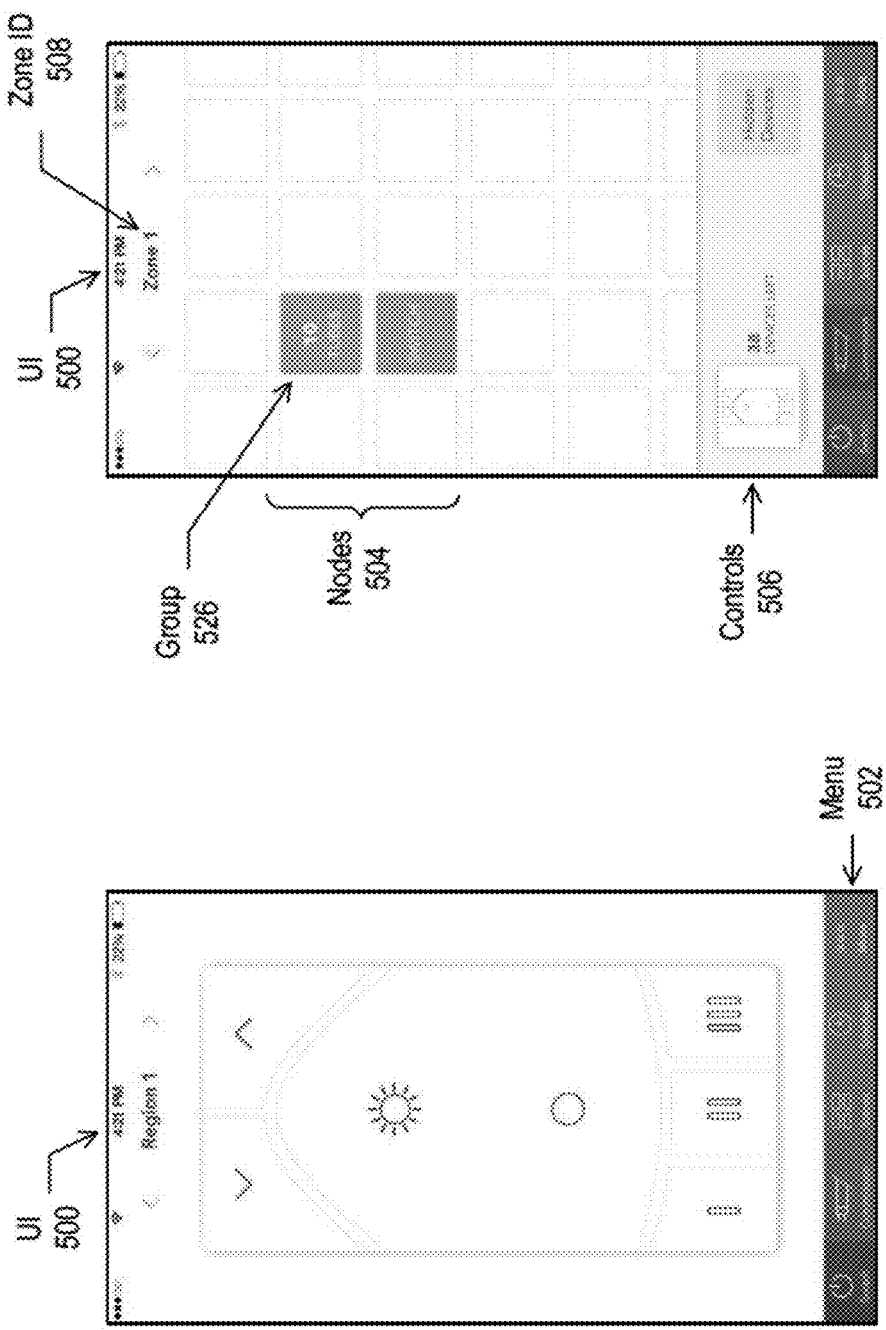

FIG. 5A shows an example of a controller screen that may be presented in the UI 500. A zone name may be presented in the navigation bar (e.g., navbar), to indicate which controller 104 this display relates to, e.g., which controller in which zone. A zone may be an area or portion of an area, such as a room, part of a room, building, floor of a building, outdoor area, and so forth. At the beginning of the commissioning process, a default initial zone may be defined and given a default name (e.g., Zone 1). The UI 500 may present a menu 502, including icons to enable a user to navigate to certain sections of the application 114 such as Switch (e.g., controller), Commission, Scenes, Schedule, and More. If no nodes have been commissioned yet, the Switch, Scenes, and Scheduler icons may be disabled, and the user may be prevented from navigating to these screens until the nodes (e.g., light sources and/or controllers) are commissioned. Left and right arrows in the navigation bar on the Switch, Commission, Scenes, and Scheduler enable navigation from zone to zone. In some implementations, the Switch screen as shown in FIG. 5A may enable a user to virtually manipulate the controls of a controller 104 in the same way the user would operate the physical controller 104, to turn light sources on and off, use the dimmer switch to control brightness, and/or use the scene controls to activate or deactivate scenes.

Figure 5C:
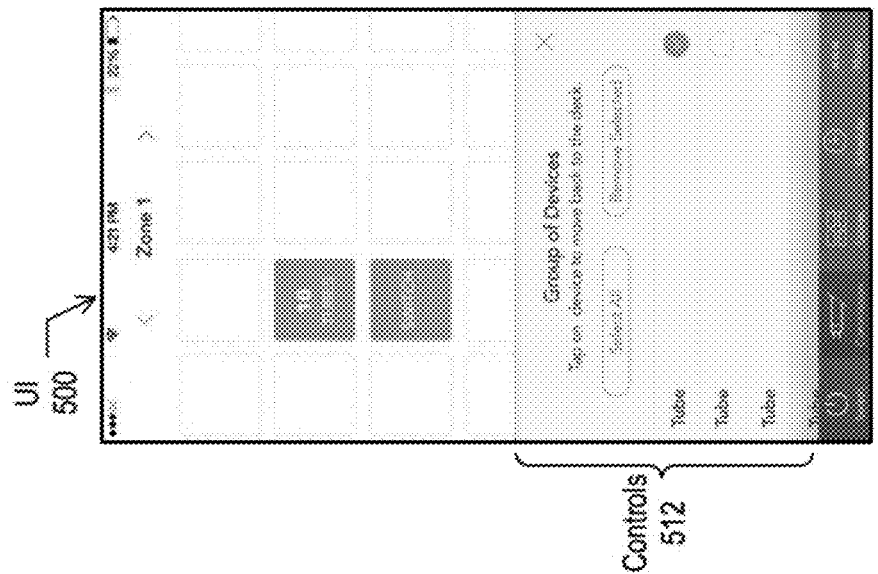
Figure 5D:
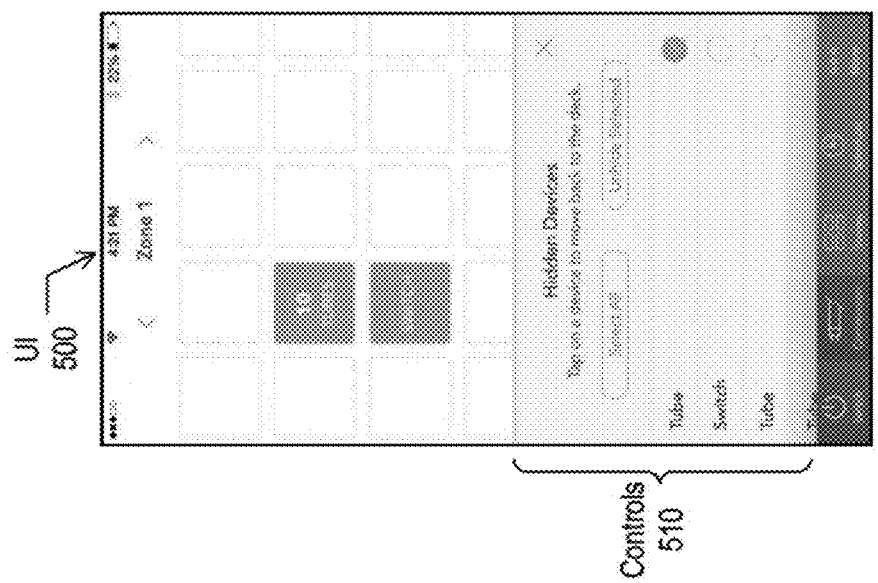

FIGS. 5B-5D show examples of a commissioning screen that may be presented in the UI 500. The commissioning screen may be employed by the user to add nodes to the mesh network and define groups of nodes. As shown in FIG. 5B, the screen may present controls 506 indicate the number of nodes (e.g., devices) remaining to be added to the network and/or groups (e.g., 38 devices left). The remaining devices may include those nodes for which an advertising signal has been received, but which have not yet been added to a group or to the hidden devices set (described below). The UI may also present a zone ID 508 indicating the zone that includes the remaining devices and/or the devices that have been added to group(s) 526. As shown in the example of FIG. 5B, the devices remaining may be presented in a stack, and the user may select the top-most node in the stack for adding to a group 526 or adding to the Hidden Devices, as described below. For each of the devices presented in the controls 506, a user may drag the device to a cell within the grid above such that the device is included in a group of nodes 526. Each cell may correspond to a group, such that dragging a device to a cell causes the device to be added to a corresponding group. The user may alternatively drag the device to the "Hidden Devices" portion of the controls 506 if they wish to hide the device for this zone, e.g., skip the handling of the device until later.

In some implementations, the UI may enable a device to be added to a group 526 or added to the network as a stand-alone node. For example, the user may drag a device from the available devices into a grid of the zone, and no other devices may be added to the same grid. In this way, an individual light source, sensor, or other device may be controlled as a separate node independently of other node(s) and/or group(s) of nodes. In some implementations, certain device type(s) may only be added to a grid as a separate node. For example, in some instances a sensor and/or a switch may not be added to a group with other node(s), and may be added to the network as a stand-alone node in its own grid of the UI for a particular zone. In general, a node may be in a group or may be on the network as a stand-alone node, and the system may control and store information regarding both stand-alone nodes and groups of nodes. A zone represents a collection of groups and/or stand-alone nodes to be organized by the user on a particular screen of the UI, as shown in the example of FIG. 5B.

In some implementations, a cell of the grid in the UI corresponds to a group of nodes. Dragging a device into for a cell of a particular zone may cause the device to be added to a group within the zone, and may also cause the device to be added to the mesh network and allocated an address. In some implementations, when the user has specified zero devices within the hidden device area, the UI 500 may present the label "Hide device" instead of "Hidden Devices." In some instances, the controller may be presented first within the deck of the controls 506 and may have its own icon, as shown. The controller may have its own cell within the grid of nodes 504 after it has been added to the group. Accordingly, the nodes 504 may have separate grid elements for various types of nodes, such as light sources 102, controllers 104, sensors 110, and so forth.

In some implementations, the "devices left" portion of the controls 506 may be a deck of virtually stacked device icons corresponding to the devices that are available to be commissioned. The top device within the deck of the controls

506 may pulsate in the UI 500 while the corresponding physical device is flashing. This may aid the user in associating the physical node with its virtual representation in the UI 500. The controls 506 may also indicate the number of devices left in the deck to be commissioned (e.g., 38 devices left). In some implementations, once a device is dragged into the grid area of nodes 504 an animation or other indication may be presented to indicate that the user may not leave the screen until all the detected devices have been commissioned. In the example shown, tubes may refer to the light sources 102 and switch may refer to a controller 104.

When the user selects the "Hidden Devices" portion of controls 506, the lower area may slide up as shown in FIG. 5C. The controls 510 may show the devices that the user has previously added to the set of hidden devices. The user may select one of the devices, causing the physical device to flash and its virtual representation to pulsate. The user may then commission this device by dragging it into the upper portion and adding it to a cell in the grid of nodes 504, the cell corresponding to a particular group. The list or other representation of hidden devices may scroll as shown. The user may select the "X" in the controls 510 to close this section of the application 114. As in the example of FIG. 5C, the user can select multiple devices, or "Select All" the devices, to be commissioned. When user selects the "Unhide Selected" button, this area slides back down, and the selected devices may be moved back to the deck for commissioning.

When the user taps on a populated cell within the grid of nodes 204, the lower area may slide up to present controls 512, as shown in the example of FIG. 5D. The controls 512 may present the devices (e.g., nodes) that are currently included in the selected group. The user may select one or more of the devices and remove the selected device(s) from the group using the "Remove Selected" button. Removing devices from a group may cause the devices to be added back into the deck to be available for adding to other groups.

Figure 5F:
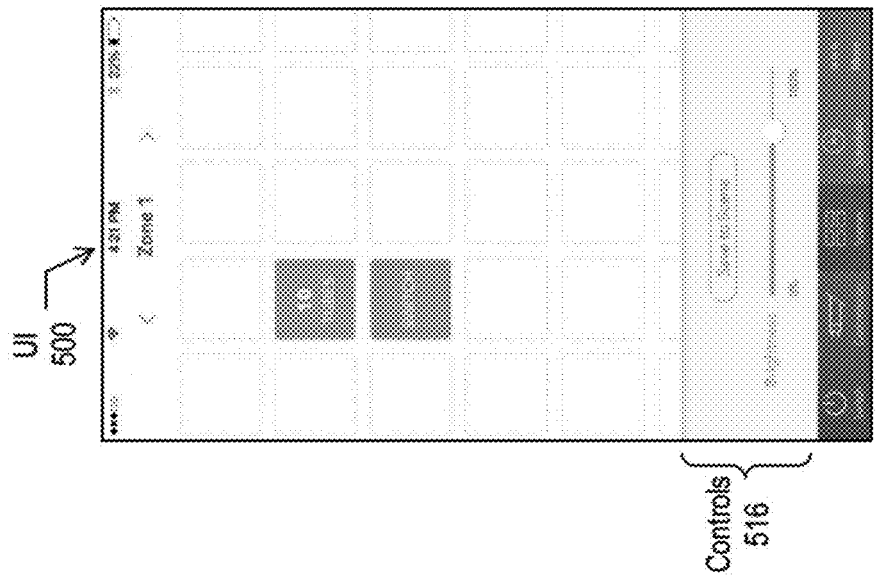
Figure 5E:
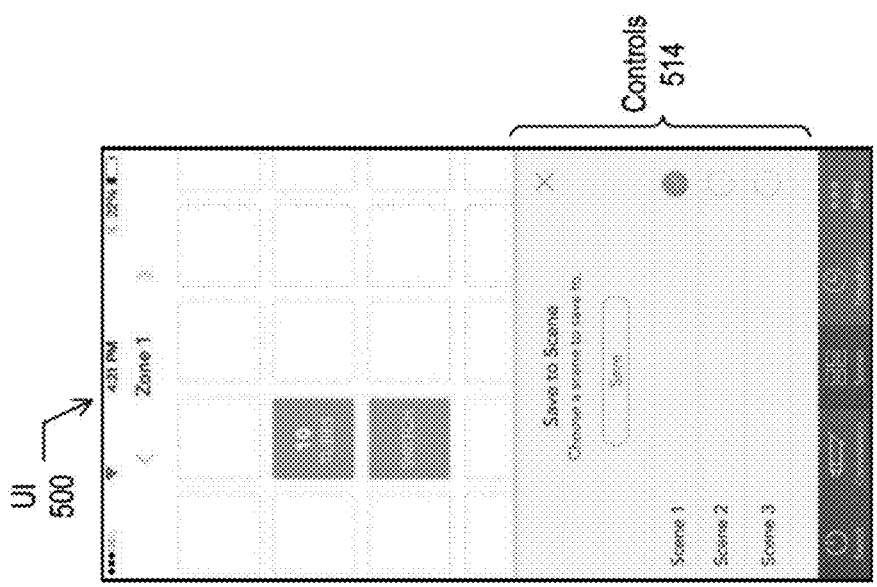

FIGS. 5E-5G show examples of a scene specification screen that may be presented in the UI 500. In the example of FIG. 5E, the user has selected the Scenes menu item while viewing the groups of a particular zone (e.g., Zone 1). This may cause the UI 500 to present controls 514, to enable the user to specify a scene that employs the groups of the zone. In the example shown, the user has selected Scene 1. In FIG. 5F, the UI 500 is presenting controls 516 (e.g., a slider control) to enable the user to specify a brightness level for the light sources 102 within the groups that are to be controlled through the scene. The UI 500 may also present other controls to enable the user to select other characteristics of the state that the light source(s) are to be in when the scene is active, such as controls to select the color, color temperature, number of LEDs to be illuminated, and so forth. The user may select the "Save Scene" button to save the scene information 118 that indicates that the scene is to include the selected groups set to the indicated brightness level.

FIGS. 5G-5I show examples of other screens that may be presented in the UI 500. As shown in the example of FIG. 5G, menu(s) 520 may be presented that enable the user to perform operations such as adding and/or editing zones, changing their email (or other login credential), changing their password, replaying an introductory video, signing out of the application 114, receiving help or other support, viewing terms and conditions of use, viewing a privacy policy, and so forth.

Selecting Add and Edit Zones may cause a screen to be presented as in FIG. 5H, including control(s) 522 to add a zone or select existing zones for editing. This screen shows the zones that the user has set up, and provides the ability to add a new zone. The user may select one of the previously configured zones to edit the zone. In some implementations, the zones may be shown in alphabetical order. To add a zone, the user may use the screen of FIG. 5I to specify a name for the zone using the control(s) 524. The UI 500 may also present other screens.

Although the examples of FIGS. 5A-5I depict a particular UI that includes particular screens, controls, and other UI elements, implementations are not limited to these examples. Implementations may provide a UI that includes any suitable number of screens, controls, and other UI elements, in any appropriate arrangement to enable a user to readily specify groups, scenes, and/or other information for managing a lighting system.

Figure 6:
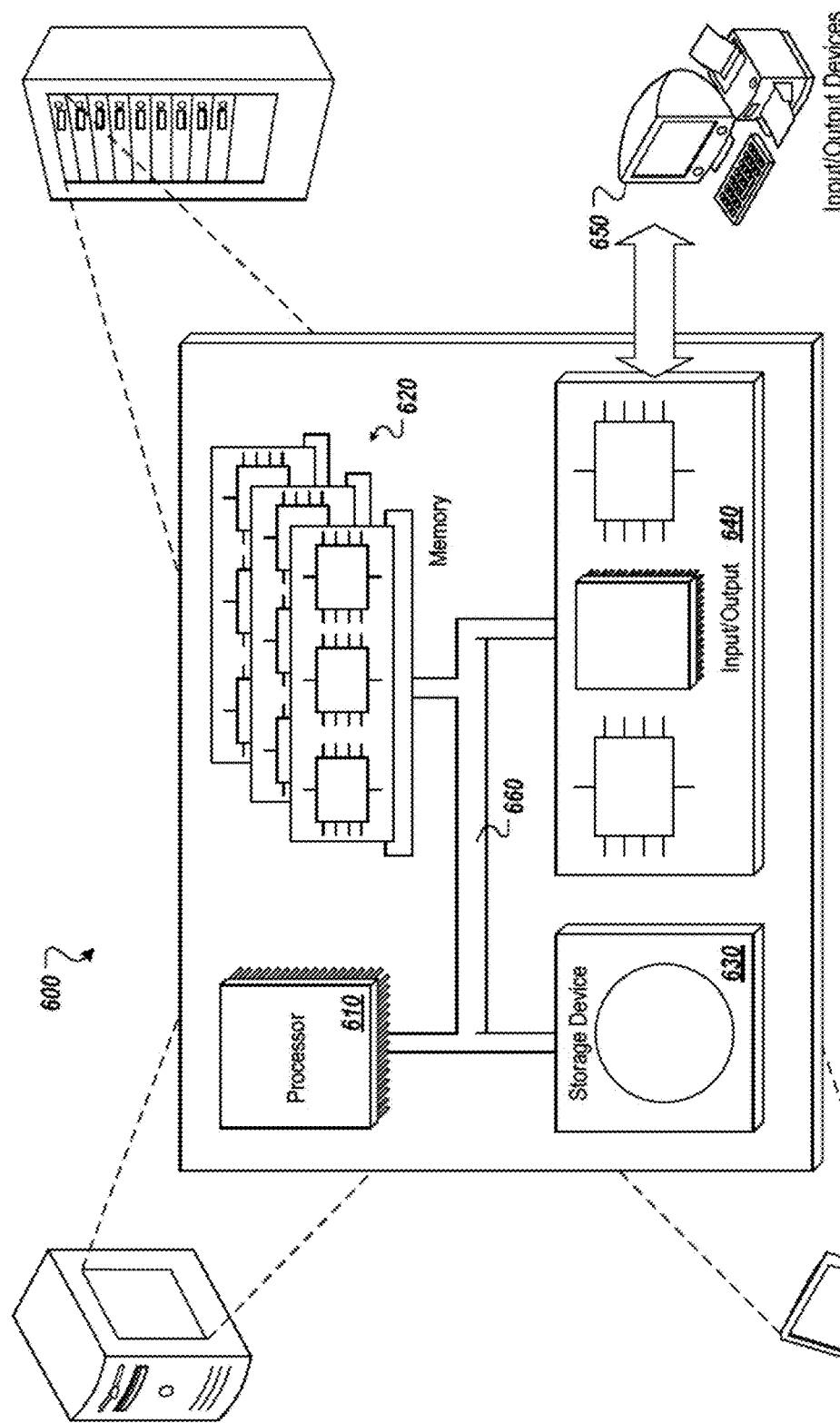
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the user device(s) 112, the server device(s) 120, the controller(s) 104, and/or other computing device(s) or system(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    presenting, by the at least one processor, in a user interface (UI), a representation of a plurality of light sources, the representation based on receiving a respective wireless advertising signal from each of the plurality of light sources;
    in response to an identification in the UI of a light source of the plurality of light sources, sending, by the at least one processor, a wireless signal to cause the light source to visibly indicate its presence, wherein the representation of the light source in the UI is altered while the light source is visibly indicating its presence;
    receiving, by the at least one processor, through the UI, a designation of the light source for subsequent control through a wireless network and, in response, adding the light source to the wireless network; and
    providing, by the at least one processor, information that describes the designation of the light source.

2. The method of claim 1, wherein:
    the light source includes an indicator component; and
    the wireless signal activates the indicator component to visibly indicate the presence of the light source.

3. The method of claim 2, wherein:
the indicator component includes at least one light-emitting diode (LED) affixed to the light source; and
activating the indicator component includes illuminating the at least one LED.

4. The method of claim 1, wherein:
the representation of the plurality of light sources includes a stack of UI elements that each represents a respective light source; and
the light source is represented by a top UI element in the stack.

5. The method of claim 4, wherein the top UI element in the stack pulsates while the light source is visibly indicating its presence.

6. The method of claim 4, wherein the UI elements in the stack are sorted within the stack based on location of the respective light sources represented by the UI elements.

7. The method of claim 1, wherein the designation of the light source includes a group that includes the light source, or an identification of the light source as a stand-alone light source.

8. The method of claim 1, further comprising:
receiving, by the at least one processor, through the UI, scene information indicating that the light source is to be set to a state when a scene is active; and
sending, by the at least one processor, over the wireless network, at least a portion of the scene information to be stored in memory on the light source.

9. The method of claim 8, further comprising:
sending, by the at least one processor, a wireless scene activation signal over the wireless network, wherein the wireless scene activation signal specifies the scene to be activated, and wherein receipt of the wireless scene activation signal by the light source sets the light source to the state associated with the scene.

10. The method of claim 8, wherein the state includes one or more of a brightness, a color, a color temperature, and a number of illuminated LEDs for the light source.

11. A system comprising:
at least one processor; and
memory communicatively coupled to the at least one processor, the memory storing instructions which, when executed, cause the at least one processor to perform operations comprising:
presenting, in a user interface (UI), a representation of a plurality of light sources, the representation based on receiving a respective wireless advertising signal from each of the plurality of light sources;
in response to an identification in the UI of a light source of the plurality of light sources, sending a wireless signal to cause the light source to visibly indicate its presence, wherein the representation of the light source in the UI is altered while the light source is visibly indicating its presence;
receiving, through the UI, a designation of the light source for subsequent control through a wireless network and, in response, adding the light source to the wireless network; and
providing information that describes the designation of the light source.

12. The system of claim 11, wherein:
the light source includes an indicator component; and
the wireless signal activates the indicator component to visibly indicate the presence of the light source.

13. The system of claim 12, wherein:
the indicator component includes at least one light-emitting diode (LED) affixed to the light source; and
activating the indicator component includes illuminating the at least one LED.

14. The system of claim 11, wherein:
the representation of the plurality of light sources includes a stack of UI elements that each represents a respective light source; and
the light source is represented by a top UI element in the stack.

15. The system of claim 14, wherein the top UI element in the stack pulsates while the light source is visibly indicating its presence.

16. The system of claim 14, wherein the UI elements in the stack are sorted within the stack based on location of the respective light sources represented by the UI elements.

17. The system of claim 11, wherein the designation of the light source includes a group that includes the light source, or an identification of the light source as a stand-alone light source.

18. The system of claim 11, the operations further comprising:
receiving, through the UI, scene information indicating that the light source is to be set to a state when a scene is active; and
sending, over the wireless network, at least a portion of the scene information to be stored in memory on the light source.

19. The system of claim 18, the operations further comprising:
sending a wireless scene activation signal over the wireless network, wherein the wireless scene activation signal specifies the scene to be activated, and wherein receipt of the wireless scene activation signal by the light source sets the light source to the state associated with the scene.

20. One or more computer-readable media storing instructions which, when executed by at least one processor, cause the at least one processor to perform operations comprising:
presenting, in a user interface (UI), a representation of a plurality of light sources, the representation based on receiving a respective wireless advertising signal from each of the plurality of light sources;
in response to an identification in the UI of a light source of the plurality of light sources, sending a wireless signal to cause the light source to visibly indicate its presence, wherein the representation of the light source in the UI is altered while the light source is visibly indicating its presence;
receiving, through the UI, a designation of the light source for subsequent control through a wireless network and, in response, adding the light source to the wireless network; and
providing information that describes the designation of the light source.

* * * * *